(12) United States Patent
Levy

(10) Patent No.: US 7,717,370 B2
(45) Date of Patent: May 18, 2010

(54) L-TAIL (FEATURING PARABRAKES)

(76) Inventor: Rodney Cliff Levy, 802 E. Marine View Dr., Everett, WA (US) 98201

( * ) Notice: Subject to any disclaimer, the term of this patent is extended or adjusted under 35 U.S.C. 154(b) by 0 days.

(21) Appl. No.: 10/349,791

(22) Filed: Jan. 23, 2003

(65) Prior Publication Data
US 2004/0089765 A1 May 13, 2004

Related U.S. Application Data

(60) Provisional application No. 60/425,926, filed on Nov. 12, 2002.

(51) Int. Cl.
*B54C 9/32* (2006.01)
(52) U.S. Cl. ...................................... 244/113
(58) Field of Classification Search .................. 244/120, 244/7 B, 87, 3.24, 3.25, 3.3, 88, 119, 45 R, 244/46, 89, 113
See application file for complete search history.

(56) References Cited

U.S. PATENT DOCUMENTS

| | | | | |
|---|---|---|---|---|
| 1,118,124 A | * | 11/1914 | Gustiana | |
| 1,165,731 A | * | 12/1915 | Webber | |
| 1,591,315 A | * | 7/1926 | Hunter | |
| 1,721,598 A | * | 7/1929 | Karrasch | |
| 1,974,040 A | * | 9/1934 | Cormona | |
| 2,376,780 A | * | 5/1945 | Kenyon | |
| 2,480,040 A | * | 8/1949 | Mitchell | |
| 2,630,984 A | * | 3/1953 | Ballauer | |
| 2,912,191 A | * | 11/1959 | Millam | |
| 3,442,472 A | * | 5/1969 | Kalina | |
| 5,722,615 A | * | 3/1998 | Bilange et al. | |

FOREIGN PATENT DOCUMENTS

| | | | | |
|---|---|---|---|---|
| GB | 145770 | * | 7/1920 | ................. 244/29 |
| GB | 578892 | * | 7/1946 | ................. 244/87 |

* cited by examiner

*Primary Examiner*—Tien Dinh

(57) ABSTRACT

A (bird tail type) airplane tail section (compound delta wing design) which includes: movable wing assemblies (92), attached to a center boom pitch assembly (76). Each rear wing assembly (92) is connected to a hydraulic control system (74) that selectively moves each rear wing assembly (92) in an arc on opposite sides of the boom pitch assembly (76). Each rear wing assembly (92) includes two pivoting parabrakes (32) mounted on the top and bottom surfaces of the wing assembly (92) that moves between a flush mounted configuration to an extended, air brake configuration. Hydraulic cylinders connected to the aircraft hydraulic system (74) are used to control the wing assemblies (92) and parabrakes (32). Disposed between the proximal end of the boom pitch assembly (76) and the aircraft fuselage is the pivoting joint (100) that enables the boom pitch assembly (76) to rotate and to pivot in all direction to simulate the movement and function of a bird's tail, when a bird is in flight.

7 Claims, 29 Drawing Sheets

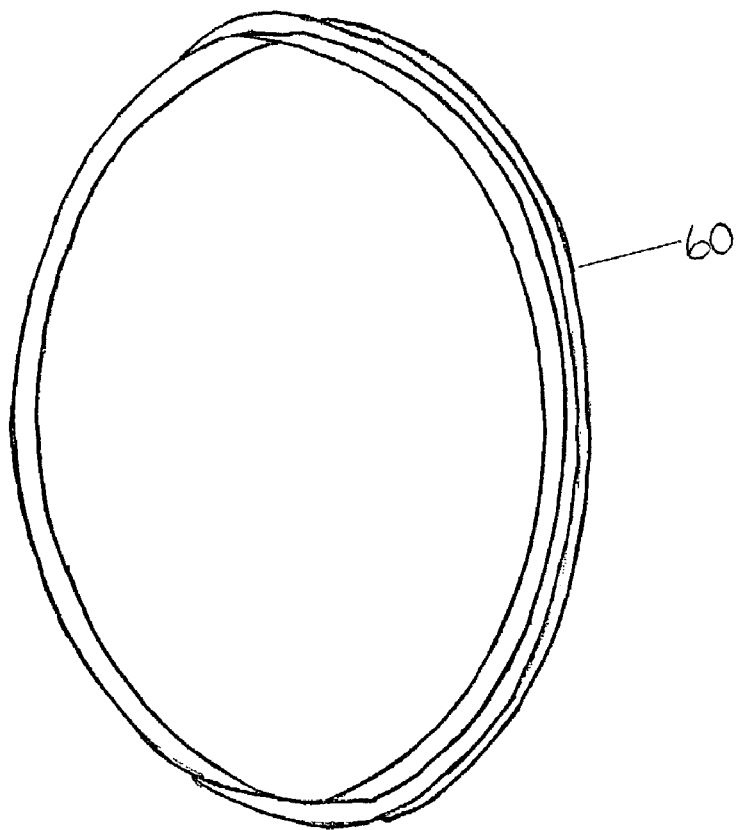 
FIG. 14A
FIG. 14B

L-TAIL (FEATURING PARABRAKES)

FIELD OF INVENTION

This application is entitled to the benefit of Provisional Patent Application Ser. No. 60/425,926, Filed 2002 Nov. 12

BACKGROUND

Description of Prior Art

Conventional Jet Fighters, and Jet Passenger Liners have fixed wing tail sections. Originally all jet fighters have a three winged tail section, or a four winged tail section; like the U.S. Fighter F-22 Raptor. Britian's first jet liner introduced in 1954, which was the first to go into service, had the conventional three winged tail section, which is still used today in all jet liners produced by Boeing, or Air Bus.

Direction of flight is determined by the tail section. Fixed wings have limited maneuverability; flaps are located on the edge of these wings, which produce limited maneuverability.

Initial Thought of Concept

Nature has always inspired man's greatest inventions. Birds conquered flight long before the invention of the Wright Brother's Airplane; Millions of years of evolution gave birds a perfect wing design, which is far superior to any man made aircraft. Tail sections of birds, unlike that of an airplane are totally mobile, moving in all directions, to achieve maximum maneuverability. This Tail Section gives birds the ability to maneuver through all types of wind situations, such as cross winds, turbulence, up drafts, down drafts, wind phenomenons, or even prevent crashes.

Tail sections of jets are fixed in one position, with flaps on the back of them for maneuverability. When applying this concept to jets, or airplanes, the logic, and common sense of this invention guarantees significant maneuverability over the conventional three winged tail section design. This maximum maneuverability would help in situations, (such as bad weather, wind phenomenons, or even a Fatal Plane Crash).

The secondary advantage of my bird tail, to (L-Tail) concept is less aerodynamic drag; the conventional aircraft tail section has three wings; two horizontal elevators on each side of the fuselage, and one rudder at the top of the fuselage. The bird tail, to (L-Tail) concept is only one wing, (shaped like a V, or L; hence L-Tail title). Less wings means less air friction, and aerodynamic drag, which means an airplane, or jet would have increased fuel efficiency, increased speed (using the same amount of power), and longer range.

The featured portion of this invention is the Parabrakes, which are four large metal doors, (two located on each side of my L-Tail) that plome out like a parachute; (hence Parabrakes); the function of the Parabrakes gives my L-Tail a superior braking advantage, that cannot be matched by wing designs of conventional airplanes. Aircraft Carrier Jets can even benefit from superior L-Tail technology; Parabrakes obsoletes the need for a tail hook landing system.

SUMMARY

A (bird tail type) airplane tail section with a pivoting maneuvering mechanism, which produces superior maneuverability over conventional tail sections, found on airplanes.

OBJECTS AND ADVANTAGES

The Primary objective of my L-Tail featuring (Parabrakes) is to achieve maximum efficiency in tail section designs in all airplanes, and jets.

(a) to give passenger Jet Liners a realistic chance of maneuvering out of wind phenomenons, rather than crashing to the ground like flying caskets.

(b) to replace Thrust Vectoring; a technology, that uses a pivoting exhaust nozzle, which redirects jet engine exhaust thrust, thus producing enhanced maneuverability; jet engine thrust is compensated by Thrust Vectoring.

(c) to increase evolution inspired superior aerodynamics; my L-Tail has only two wings, but conventional tail sections have usually three, to four winged tail sections, (which increases weight, and air friction, thus decreasing speed, range, and fuel efficiency.

(d) to incorporate a far superior air braking system into wing designs; Parabrakes (e) to decrease manufacturing cost, development, and complication; L-Tail technology is based on evolution that is a proven means to confirm viability; developmental cost has an adverse effect on manufacturing cost.

(f) to incorporate emergency backup systems, (which are standing by to go into service, while aircraft are in flight).

Further objects, and advantages are to use proven heavy duty parts, and reinforced construction; tail sections that fall apart, and one dimensional backup systems have caused fatal crashes. The application of L-Tail technology to military aircraft, (including bombers, and fighters) significantly improves performance; (speed, control, range, maneuverability, and fuel efficiency).

DRAWING FIGURES

In the drawings, closely related figures have the same number but different alphabetic suffixes.

FIG. 1 is a map (top and internal view) that shows the location of parts; (demonstrates the relativity, and connection of parts to one another).

FIGS. 2A, and 2B shows two different views of the U.S. MIGHTY Stealth Jet Fighter, the F-22 Raptor.

FIG. 3 shows the U.S. F-15 Strike Eagle, that preceded the MIGHTY F-22 Raptor.

FIGS. 4A, and 4B shows front, and rear views of a mid 21st century Stealth Jet Fighter.

FIG. 5 shows a mid 21st century stealth fighter, idle on a mid 21st century Aircraft Carrier called the U.S.S. "INVINCIBLE"; (refer to Pending Provisional Patent titled, "HYPERCLASS" Aircraft Carrier, P.P.A. #60/420,816, filed Oct. 25, 2002). The mid 21st century stealth jet fighter does not need a Tail Hook System, due to the fact that it is equipped with (L-Tail) technology, with Parabrakes, (which obsoletes the conventional tail hook system used on Conventional Aircraft Carriers).

FIG. 6 shows a business jet, (idle) with my L-Tail, (Featuring Parabrakes).

FIGS. 7A, and 7B shows top, and side views of conventional tail sections on conventional jet liners, respectively.

FIG. 8A, and 8B shows a front view of an "L-Tailed" jet liner, and the front view of a conventional jet liner, respectively.

Figure 12A:
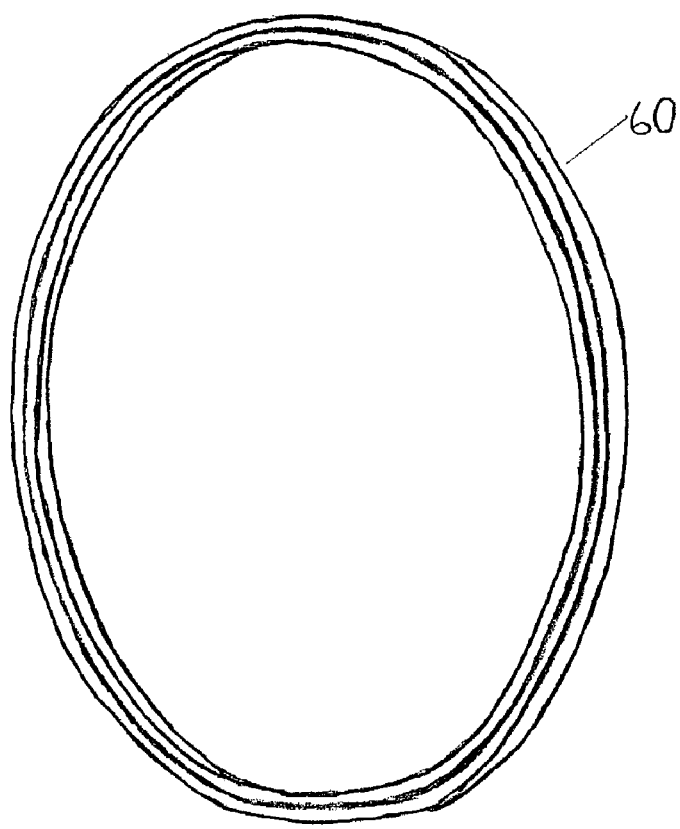
Figure 12B:

FIGS. 12A, and 12B O Ring Concave seals, respectively.

Figure 13:
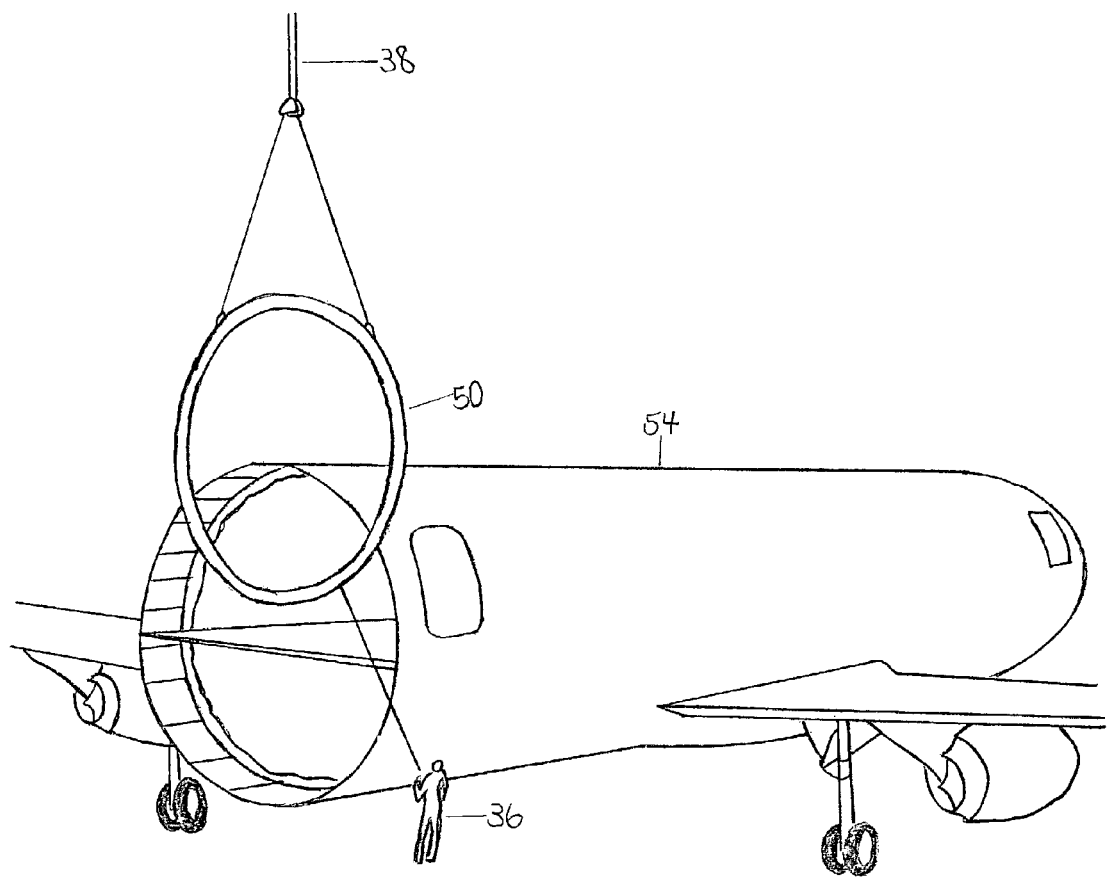

FIG. 13 shows the O Ring Concave connection to the jet liner.

FIGS. 14A, and 14B shows the O Ring Convex seals, respectively.

Figures 15A, 15B:
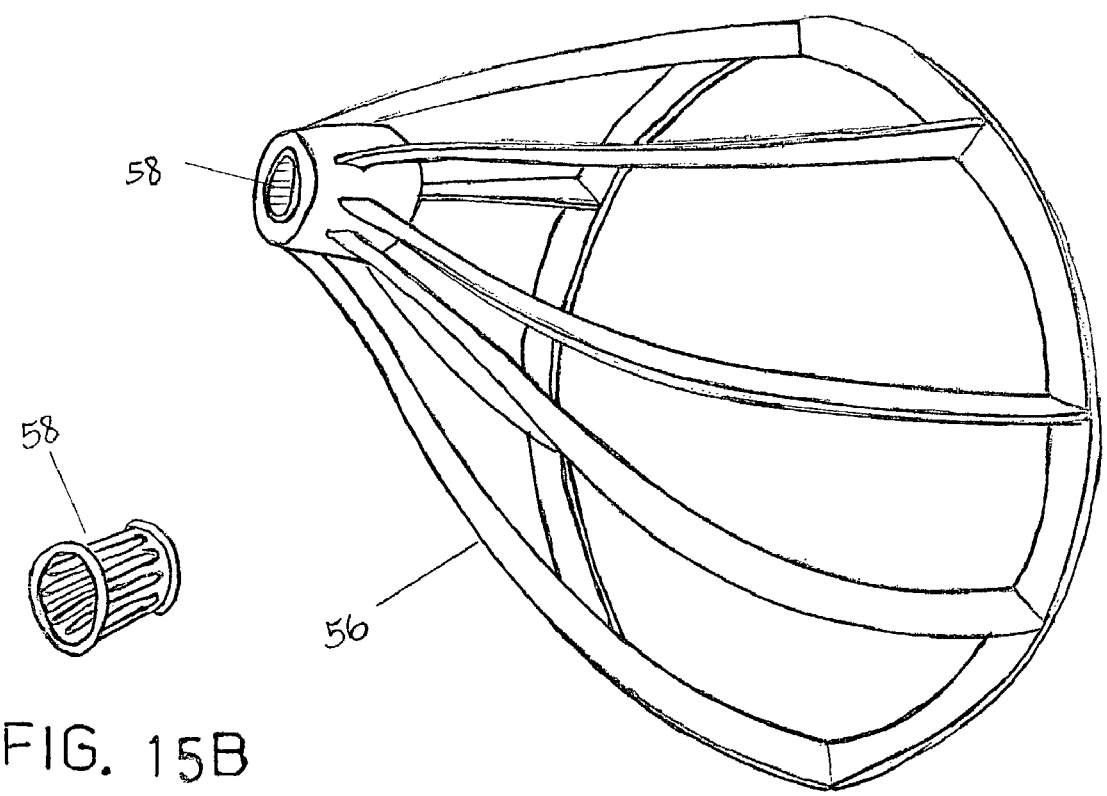

FIGS. 15A, and 15B shows the L-Tail Frame Section, and Ball Bearing Barrel, respectively.

Figure 16:
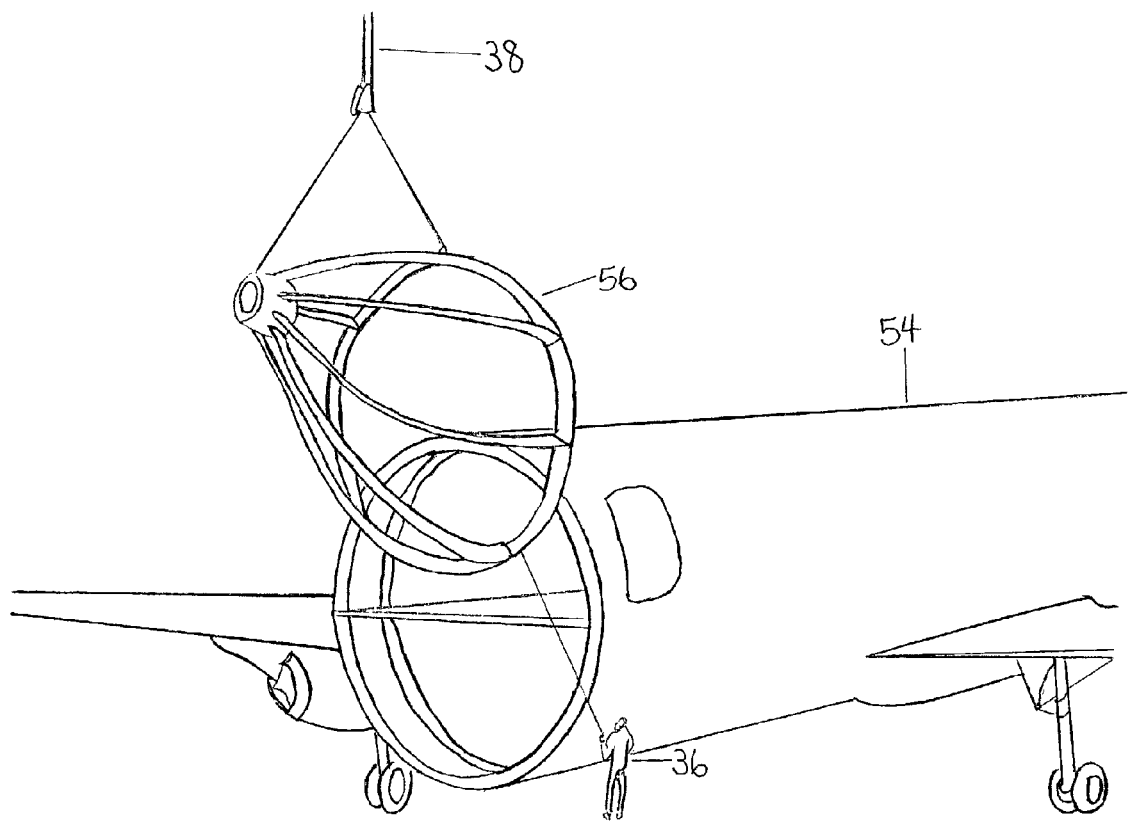

FIG. 16 shows the L-Tail Frame Section, and a conventional jet liner.

Figure 17A:
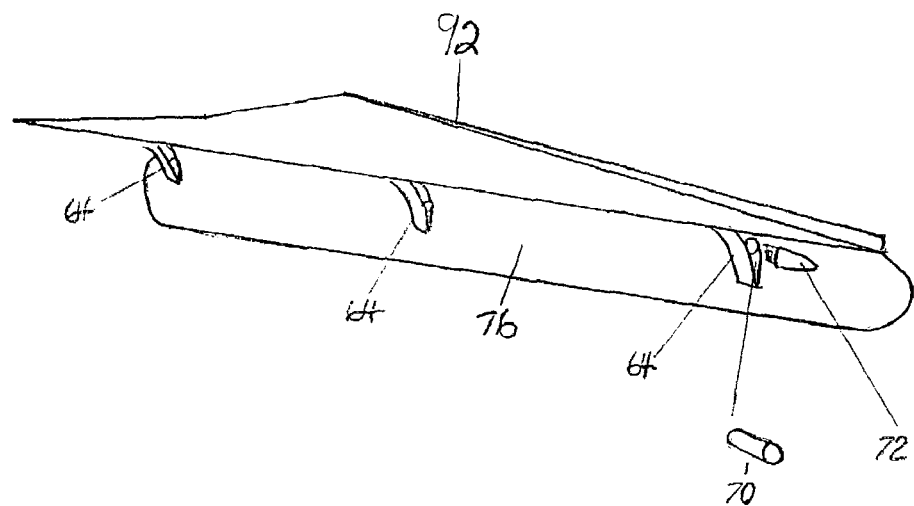
Figure 17B:
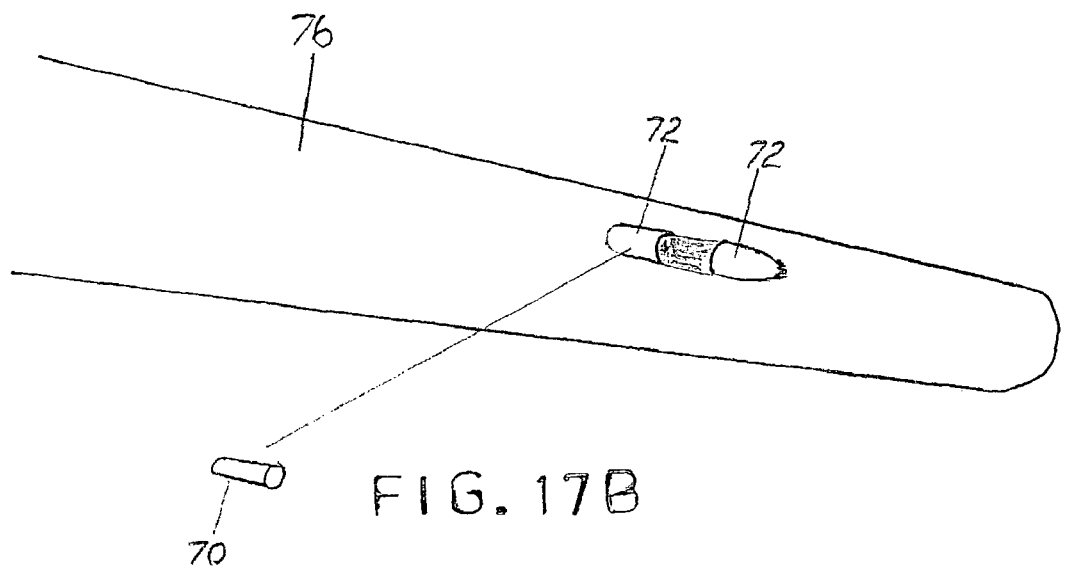

FIGS. 17A, and 17B shows the Wings, to Boom Pitch assembly, respectively.

Figure 18A:
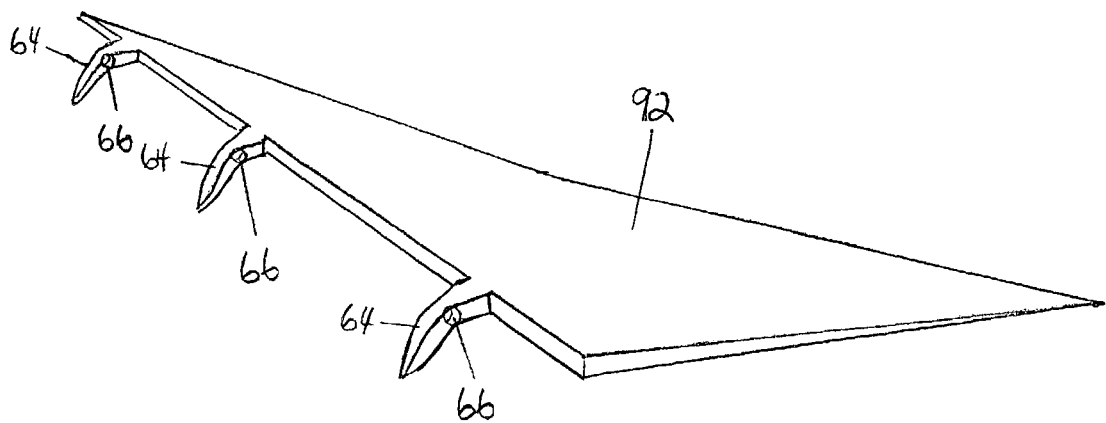
Figure 18B:
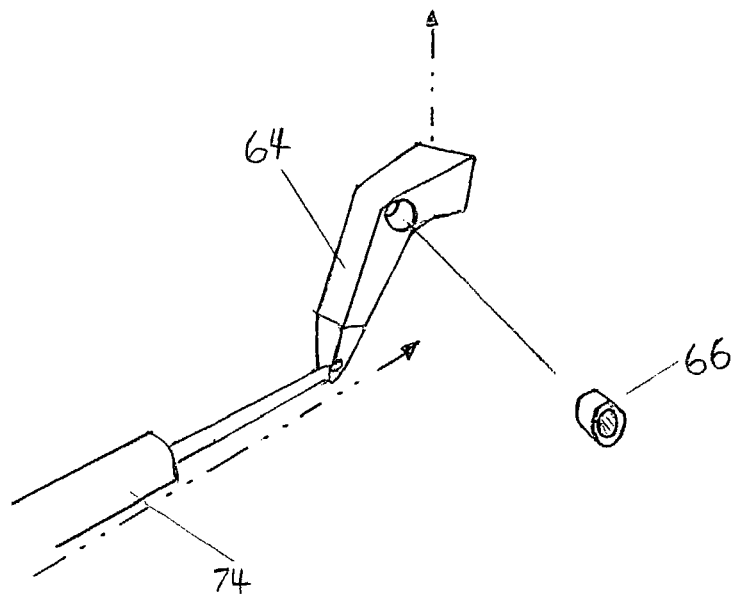

FIGS. 18A, and 18B shows the Lever Hinge to Wings, and X Cross Wing Pitch Hydraulics to Lever Hinge Assembly.

Figure 19A:
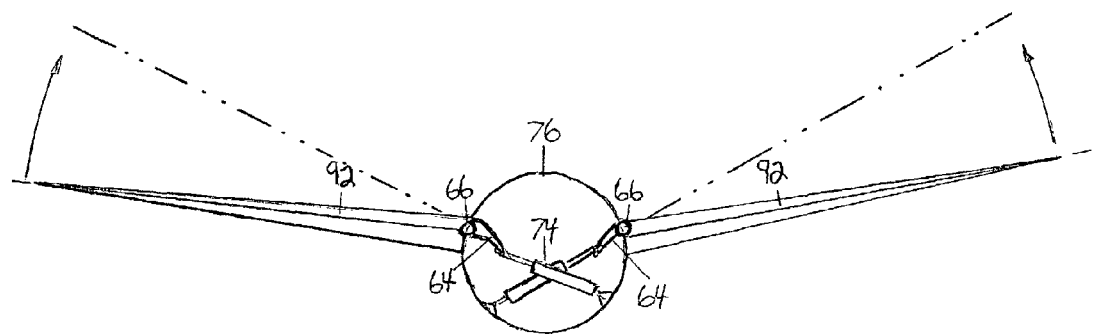
Figure 19B:
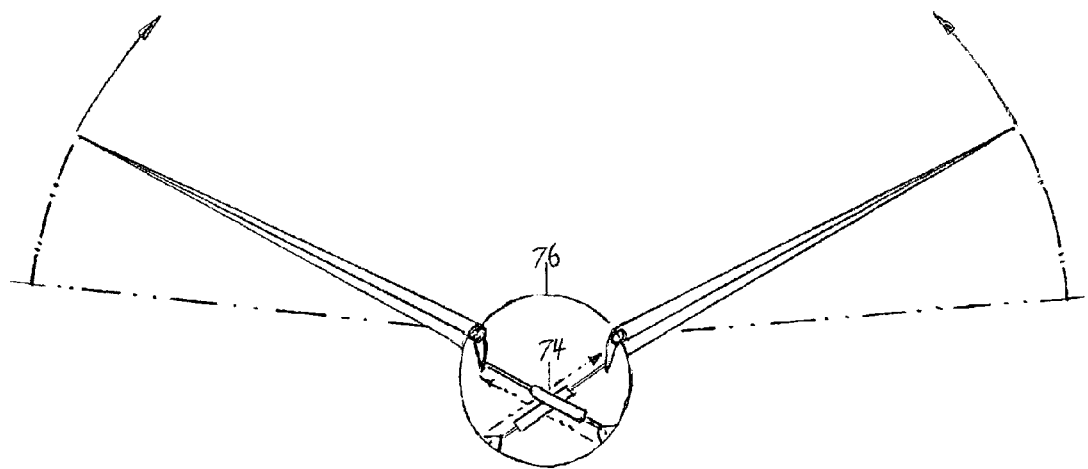

FIGS. 19A, and 19B shows the L-Tail.

Figure 20A:
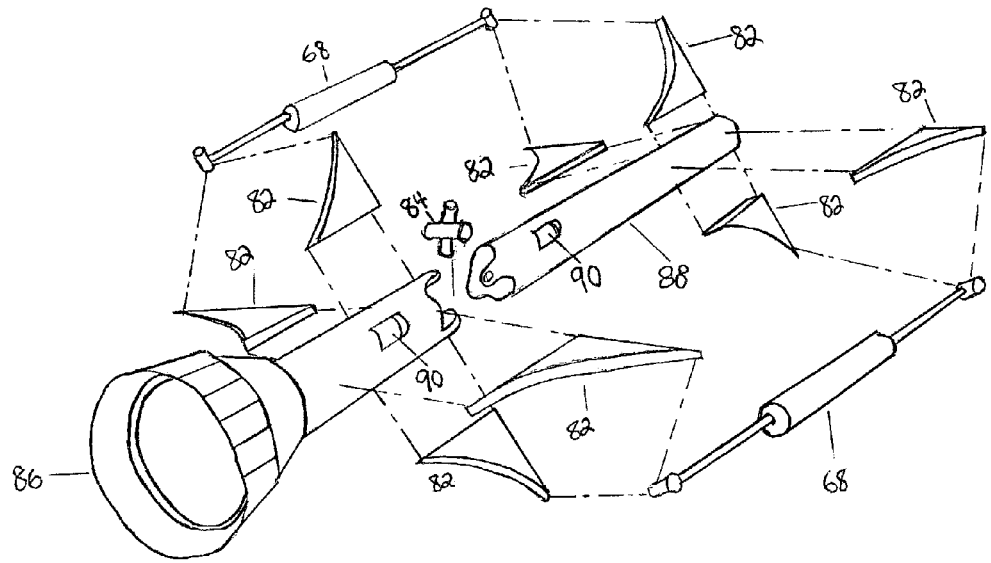
Figure 20B:
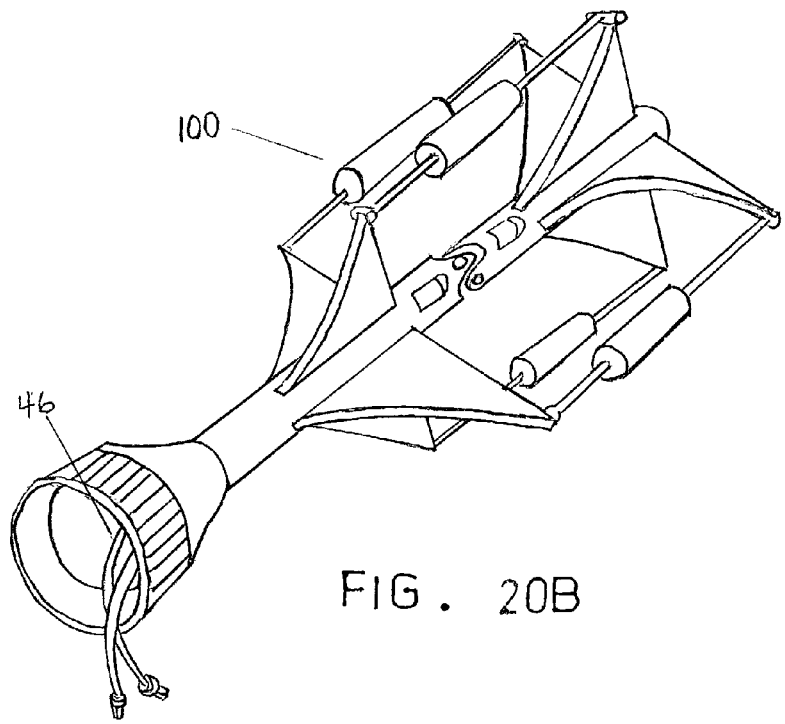

FIGS. 20A, and 20B shows the Pivoting Joint assembly, respectively.

Figure 21:
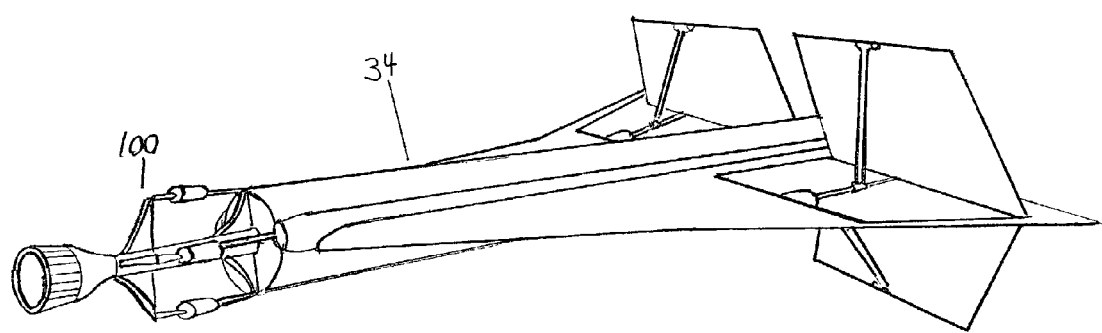

FIG. 21 shows the Pivoting Joint, and L-Tail assembly.

Figure 22:
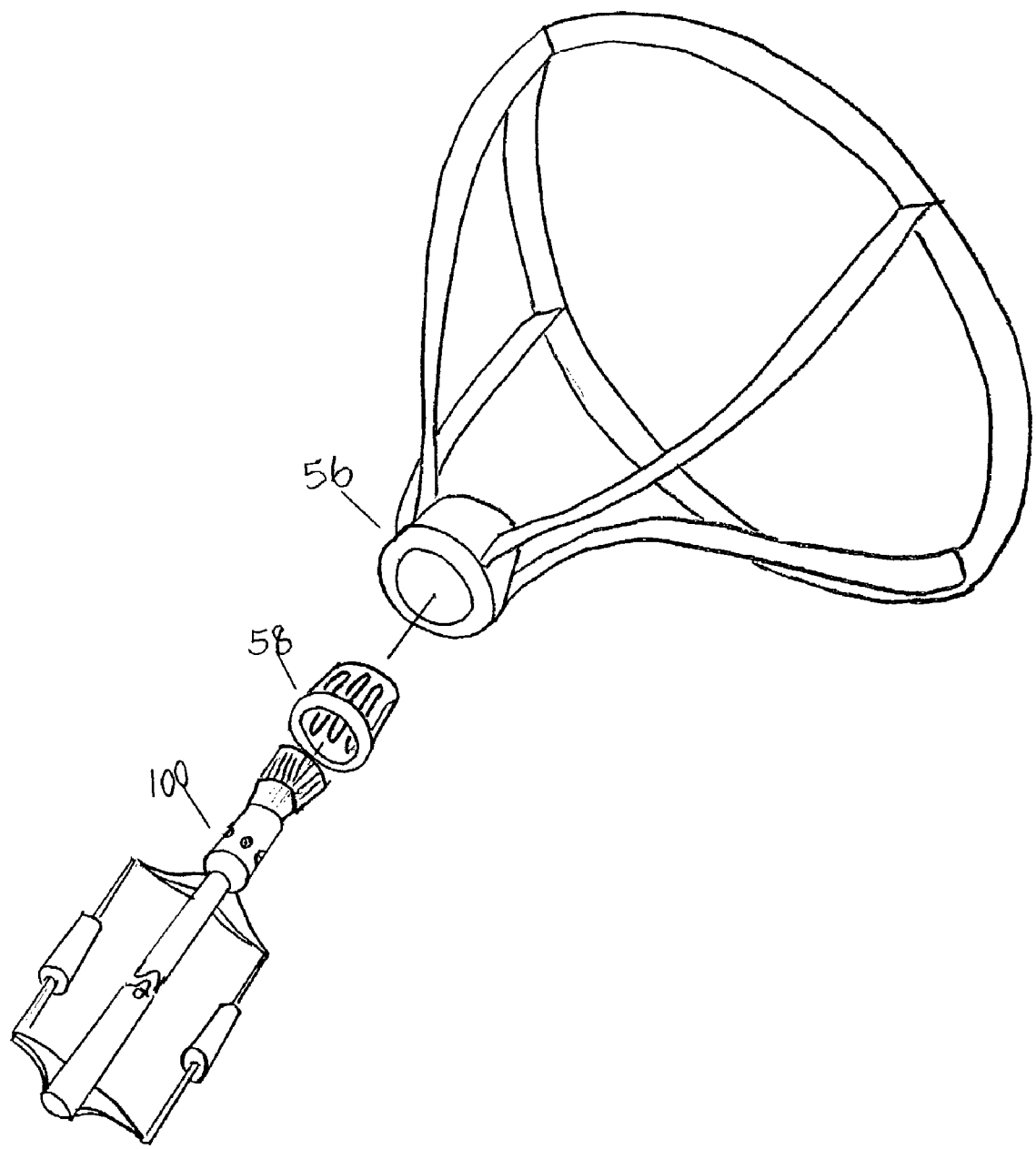

FIG. 22 shows the relation of the Pivoting Joint, to the L-Tail Frame Section.

FIG. 23 features the stabilizing of the L-Tail

Figure 24:
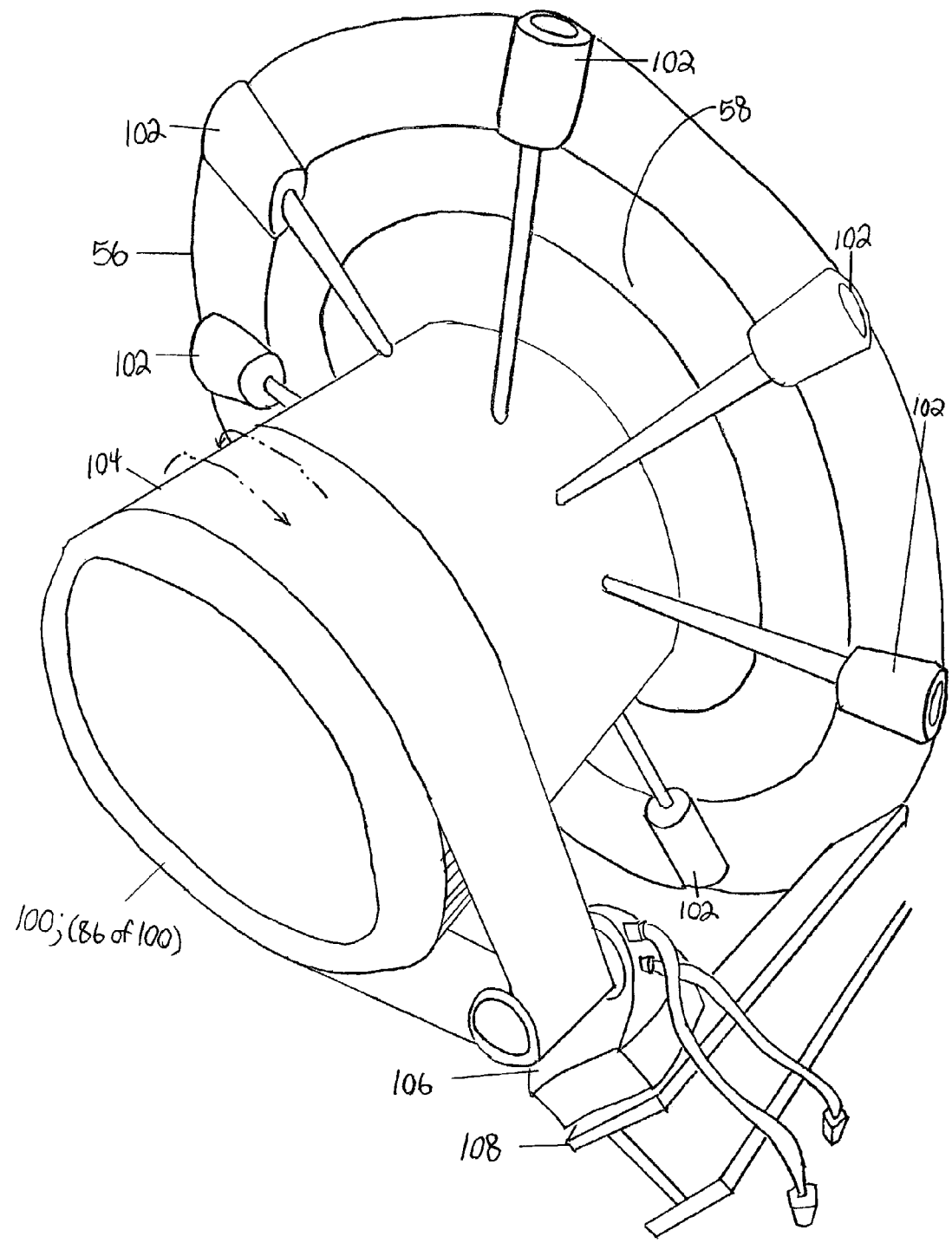

FIG. 24 shows the stabilizing, and introduction of powered rotation, relative to the L-Tail.

Figure 25:
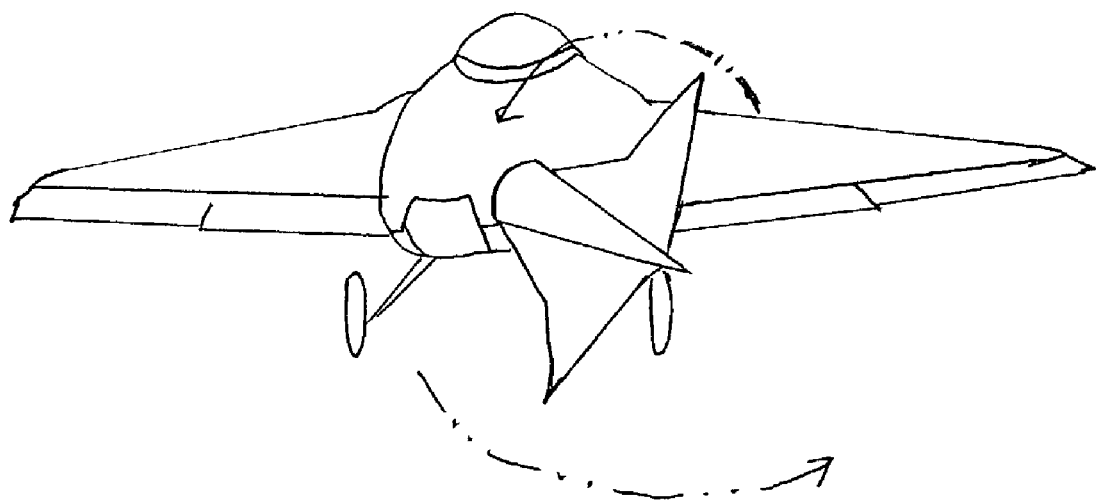
Figure 26:
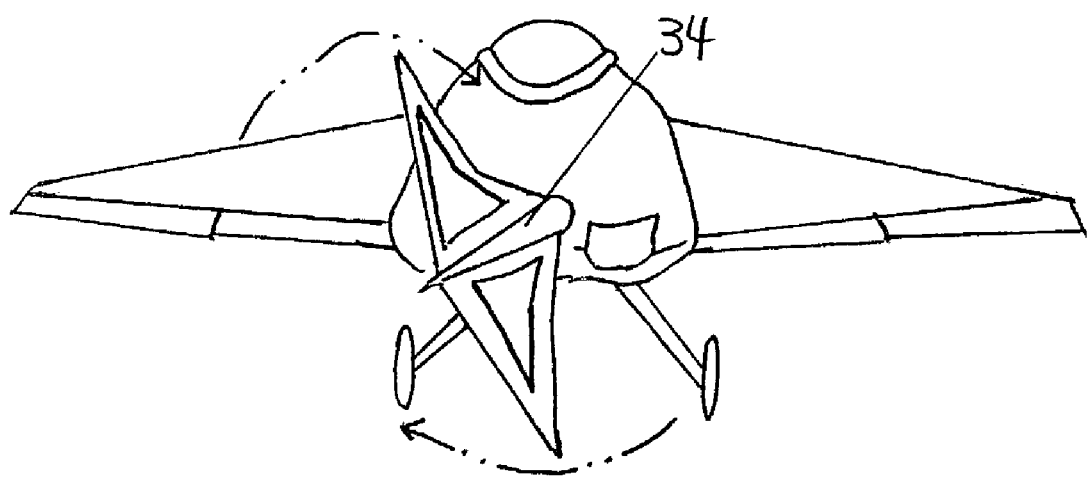

FIG. 25, and 26 shows a Stealth Jet Fighter

Figure 27:
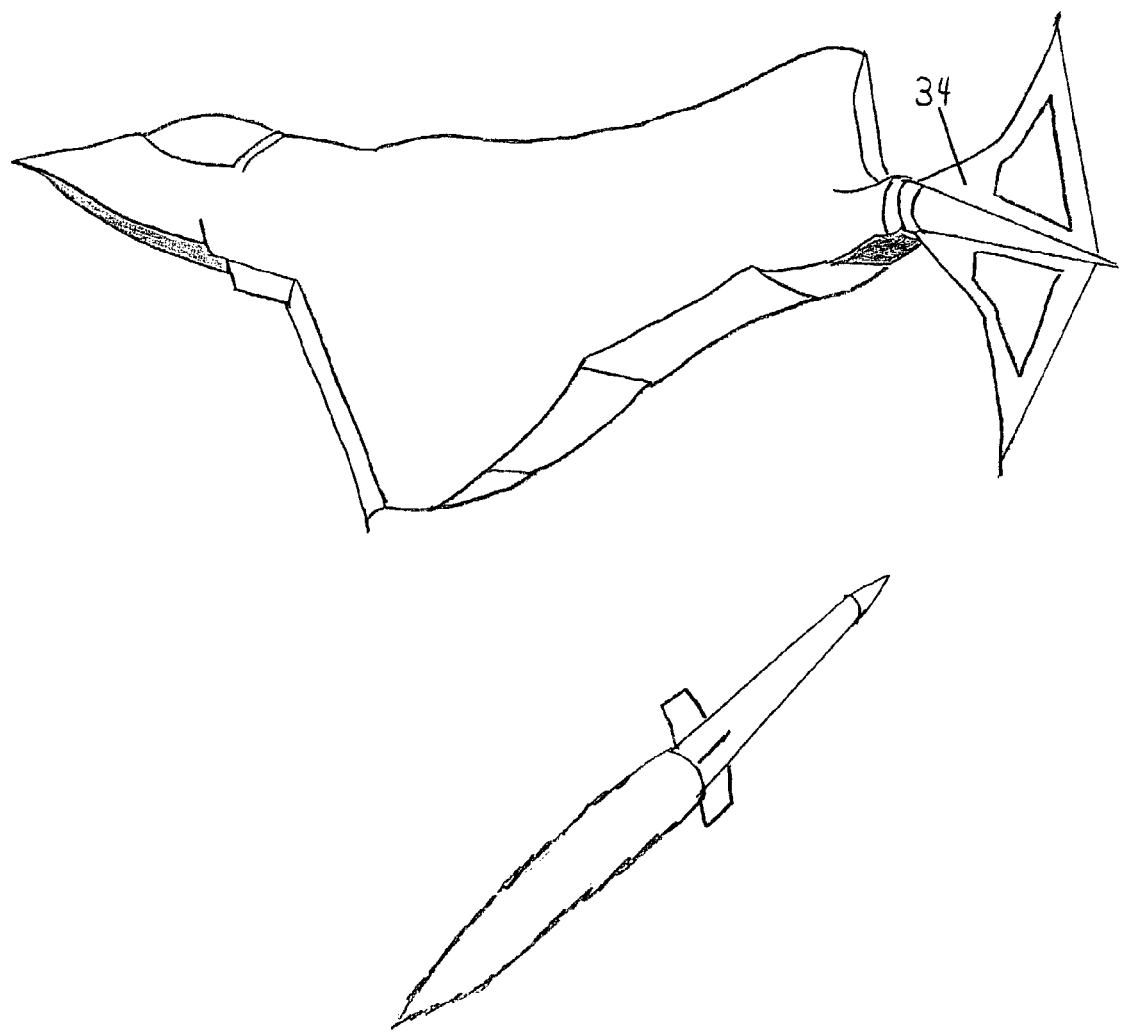

FIG. 27 show a Stealth Jet Fighter, and a surface to air Missile.

Figure 28:
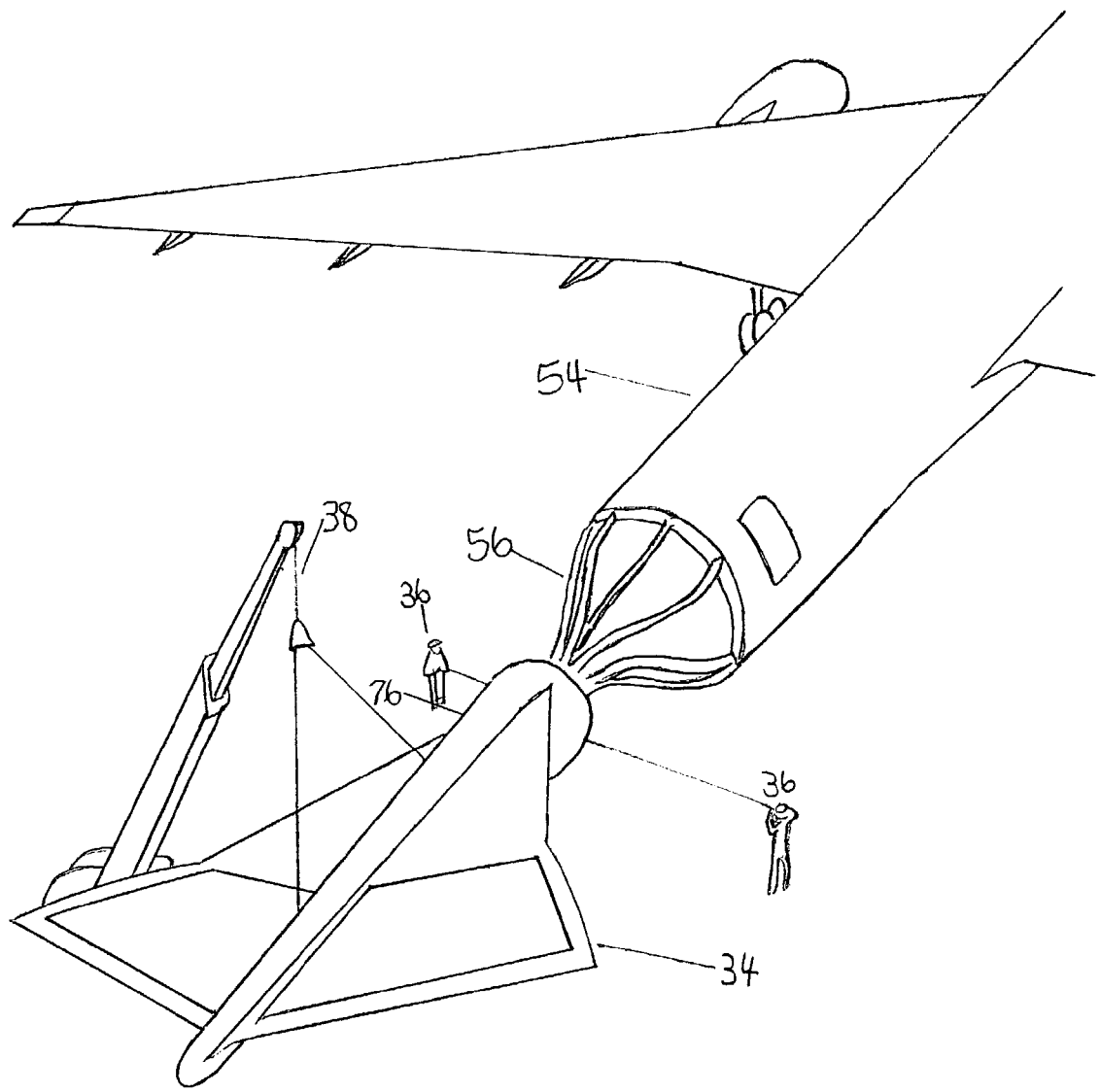

FIG. 28 shows a Conventional Jet Liner, with L-Tail technology.

Figure 29:
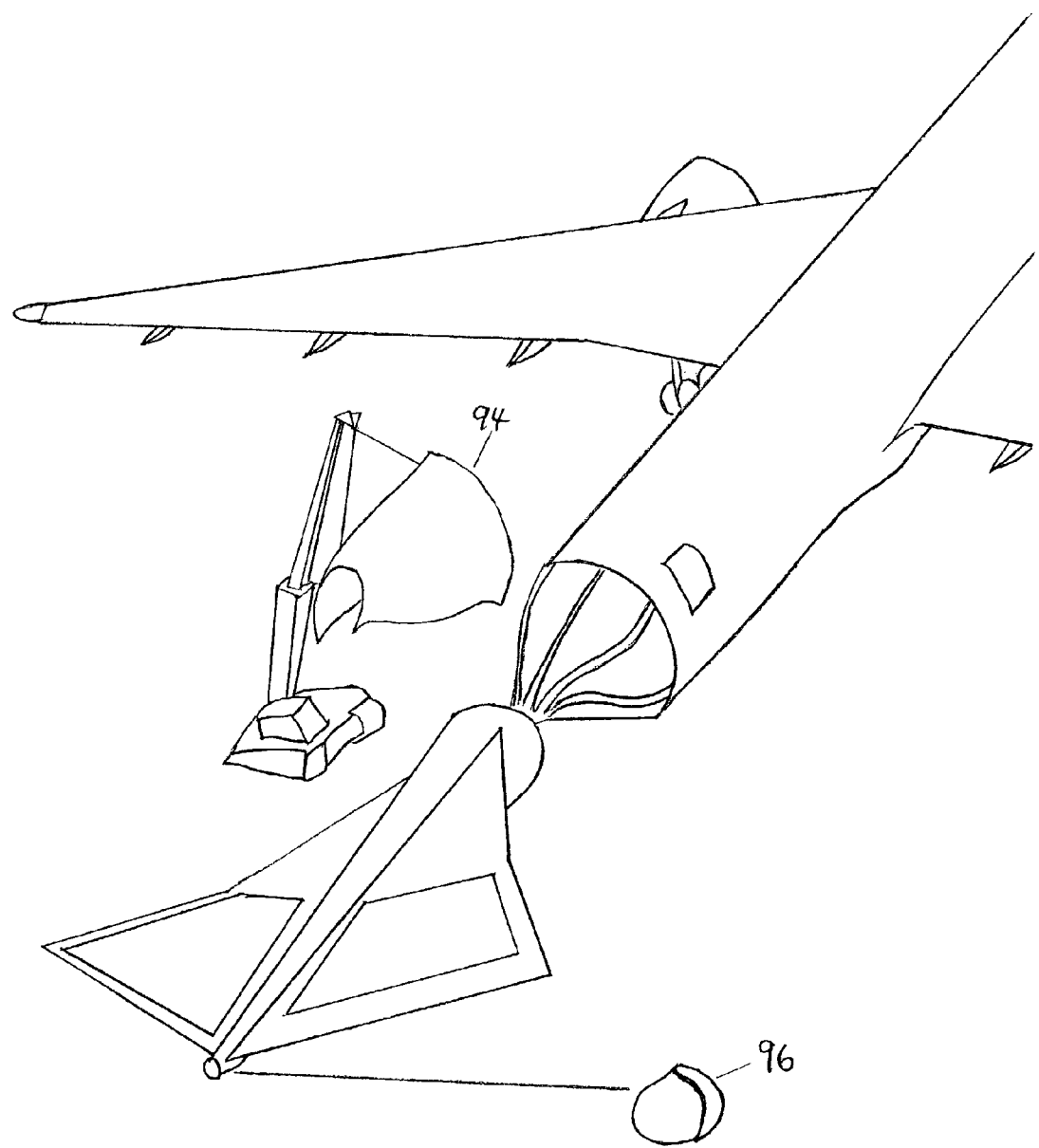

FIG. 29 shows a Conventional Jet Liner, with L-Tail technology, and concluding assembly.

REFERENCE NUMERALS IN DRAWINGS

Figure 1:
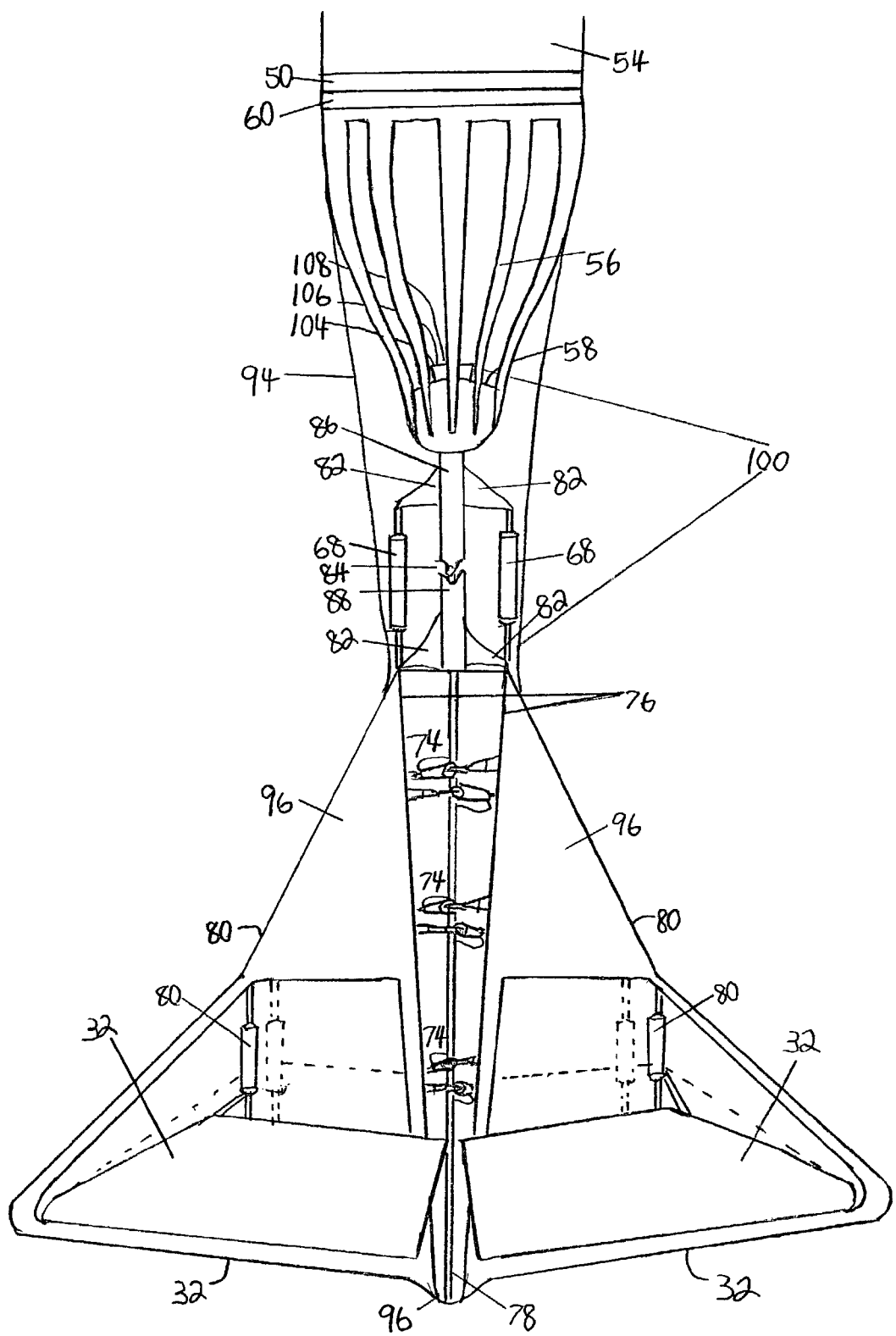

24 Conventional Jet Fighter Rudder
26 Conventional Jet Fighter Horizontal Elevator
28 Conventional Jet Liner Tail Rudder
30 Conventional Jet Liner Horizontal Elevator
32 Parabrakes
34 L-Tail
36 Worker (Ironworker)
38 Overhead Crane
40 Cutting Line
42 Plumming
44 Climate Control
46 Hydraulics
48 Electrical
50 O Ring (Concave)
52 O Ring Square Bevel
54 Conventional Jet Liner
56 L-Tail Frame Section
58 Ball Bearing Barrel
60 O Ring (Convex)
62 O Ring (Convex) Square Bevel
64 Lever Hinge
66 Ball Bearing Ring
68 Hydraulic Push Rods (Pivoting Joint)
70 Pin Shaft
72 Shaft Socket
74 X Cross Wing Pitch Hydraulics
76 Boom Pitch
78 Hydraulic Parabrake Hoses
80 Hydraulic Push Rods (Parabrakes)
82 Hydraulic Stabilizers
84 Universal Joint
86 Boom Shaft
90 Jump Holes
92 Wing Assembly
94 Frame Cover
96 Rear Wing Cap Assembly
98 Thrust Vectoring Exhaust Nozzle
100 Pivoting Joint
102 Roller Bar Stabilizer
104 Belt Drive
106 L-Tail Pitch Hydraulics
108 Beam Stabilizer Description FIG. 1 is a parts reference to my L-Tail, (Featuring Parabrakes).

Figure 2A:
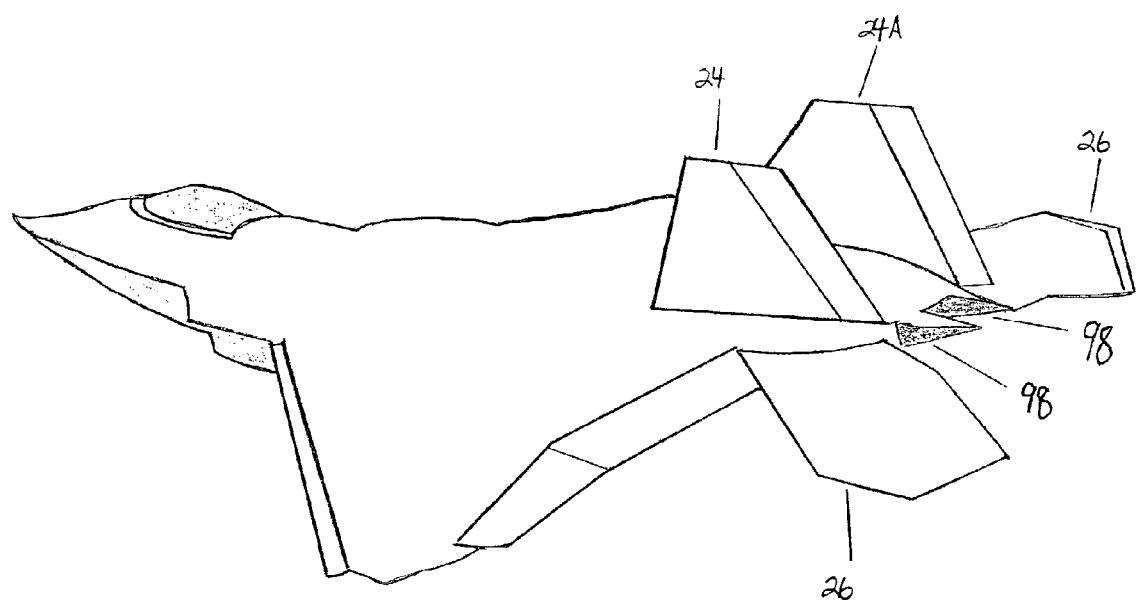
Figure 2B:
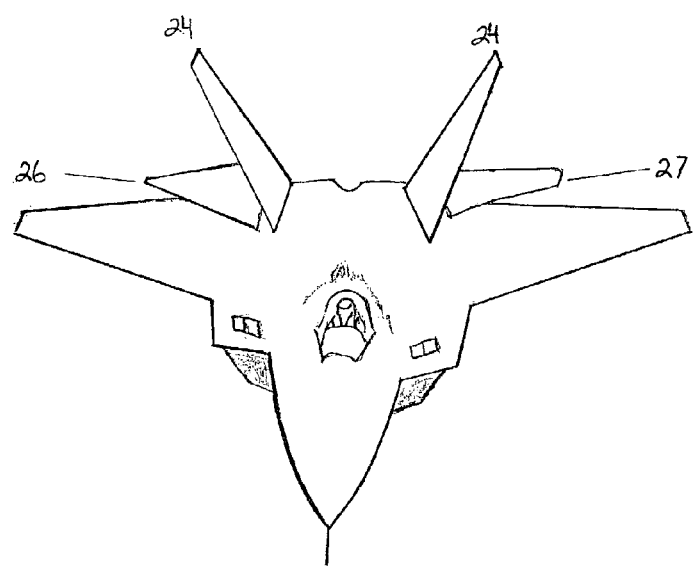

FIGS. 2A, and 2B demonstrates the complication of a conventional jet fighter; there are two stationary rudders 24, and two horizontal elevators 26, which make up a total of four wings; (which increases air friction, thus decreasing speed, and fuel efficiency). Thrust Vectoring Exhaust Nozzles 98 improves maneuverability, but compensates jet engine thrust.

Figure 3:
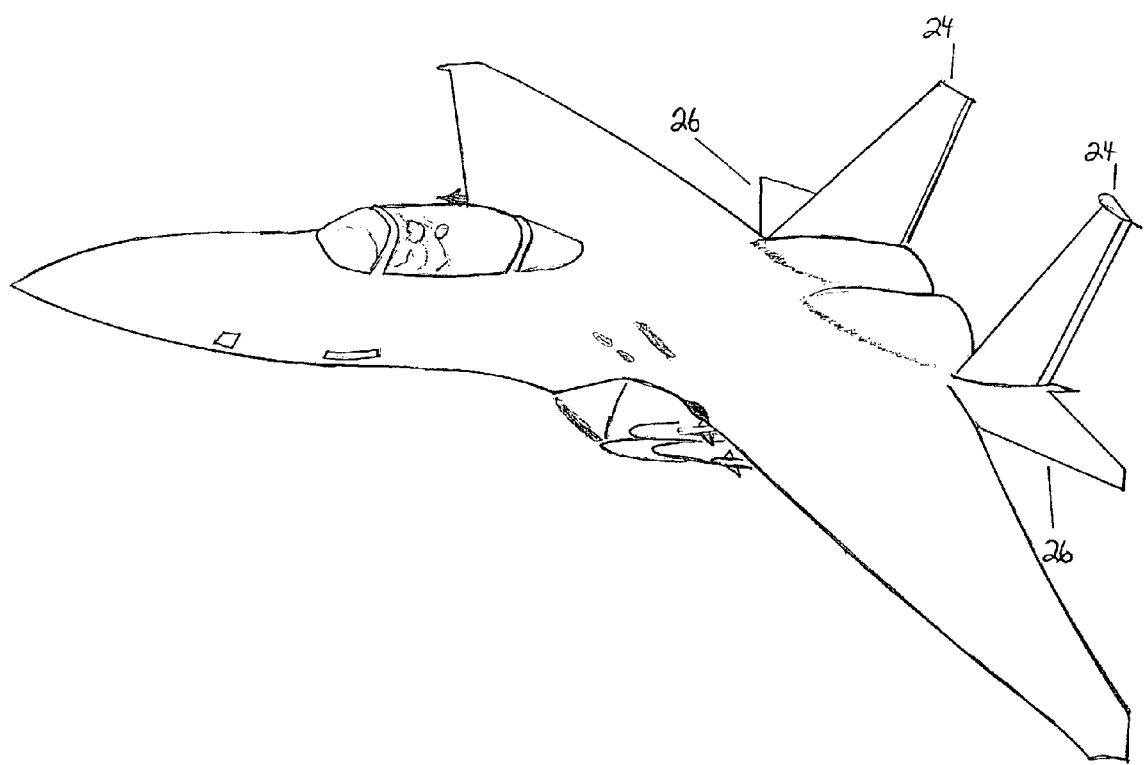

FIG. 3 also demonstrates the increased air friction, and weight of a conventional tail section, on a jet fighter.

Figure 4A:
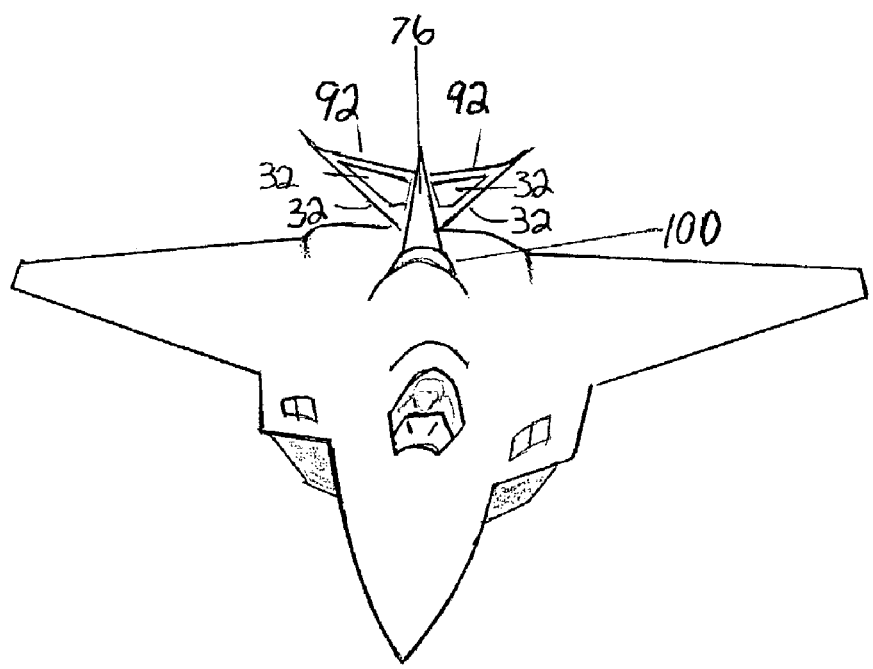
Figure 4B:
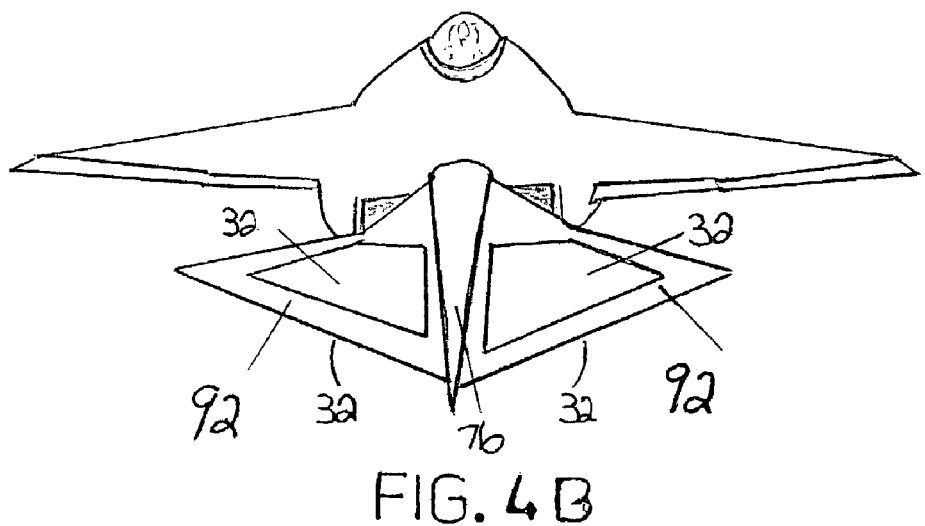

FIGS. 4A, and 4B shows the aerodynamic superiority of L-Tail Technology on a jet fighter.

Figure 5:
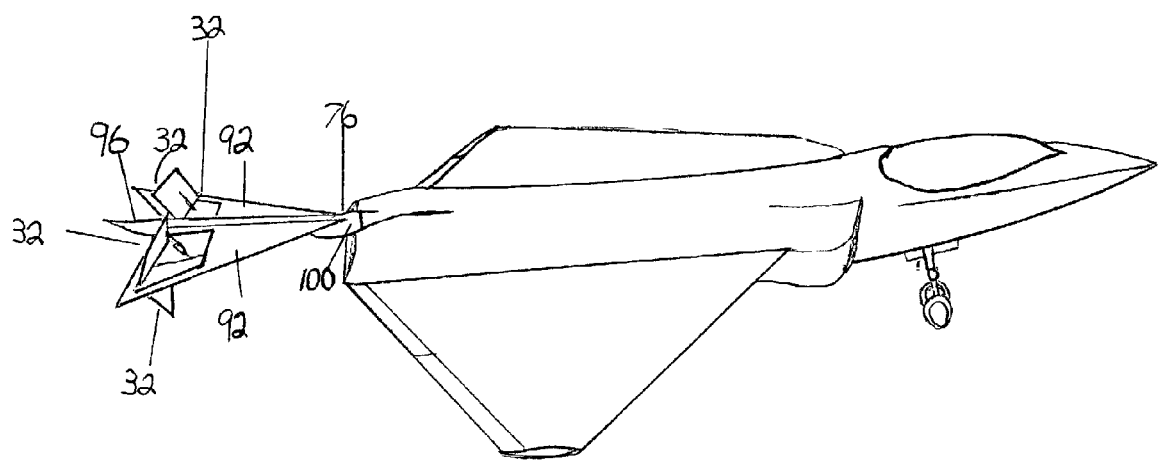

FIG. 5 is a side view of my L-Tail on a Stealth jet Fighter.

Figure 6:
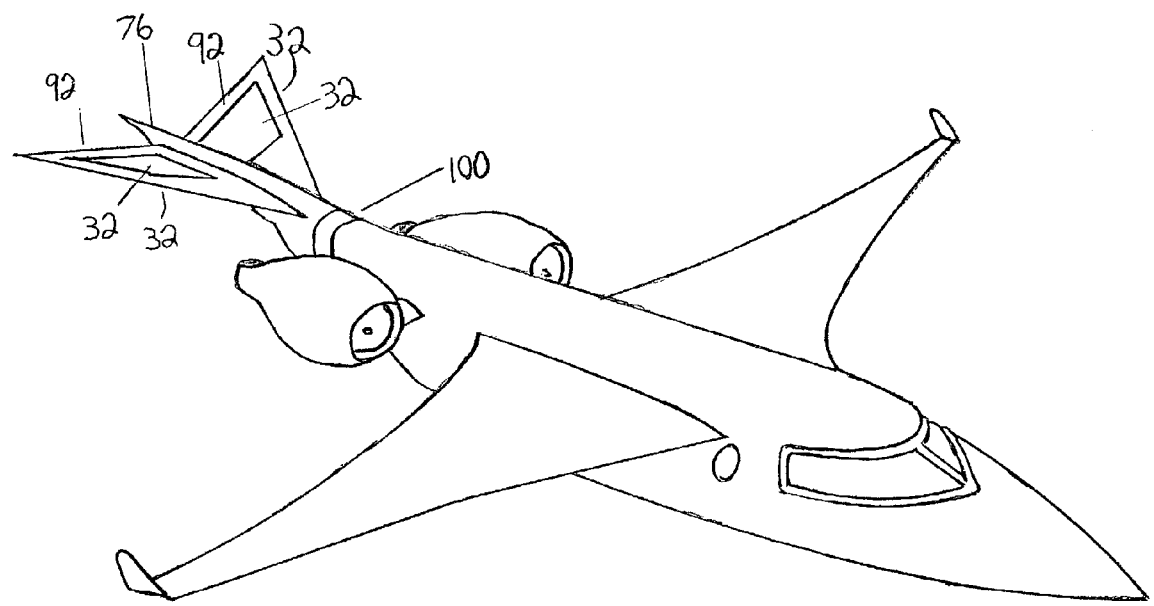

FIG. 6 show the beauty, and attractiveness of a business jet with L-Tail technology.

Figure 7A:
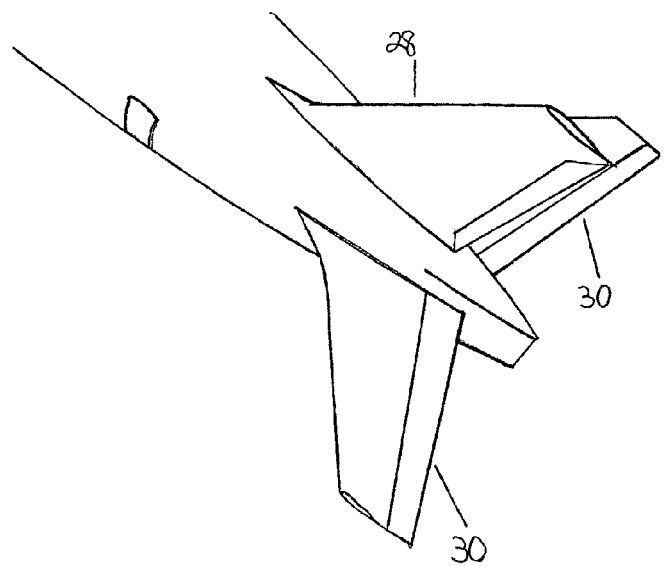
Figure 7B:
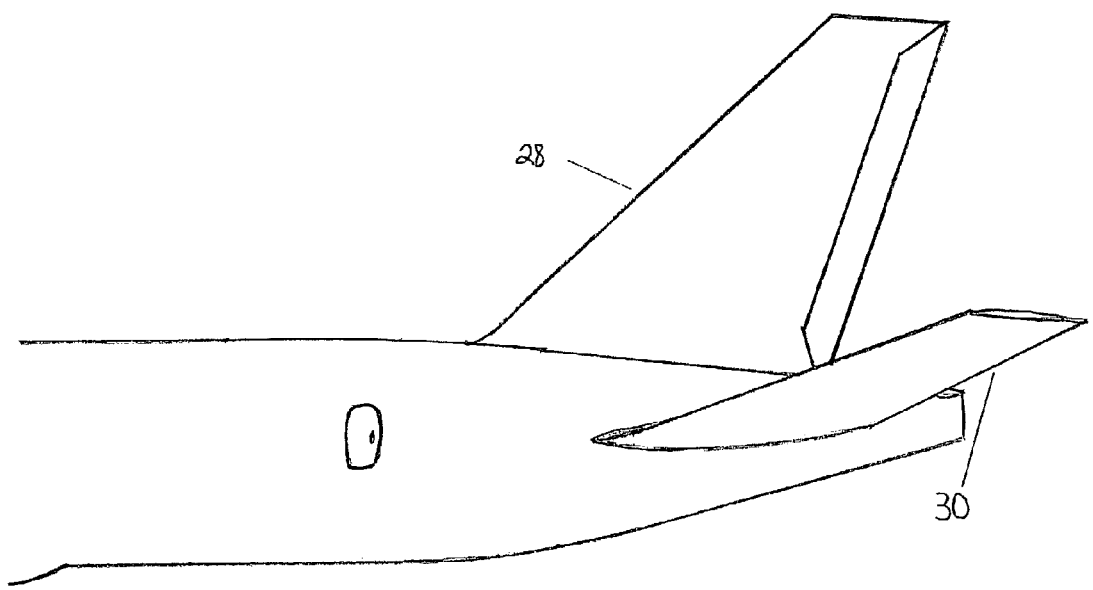

FIG. 7A is the tail section of a conventional tail section, relative to the size of a jet liner fuselage, and FIG. 7B shows how the rudder 28 is almost twice the length of the diameter of a jet liner fuselage.

Figure 8:
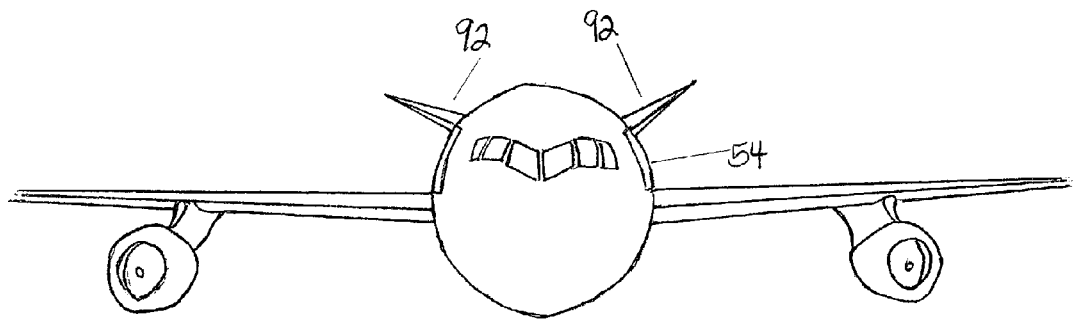
Figure 8:
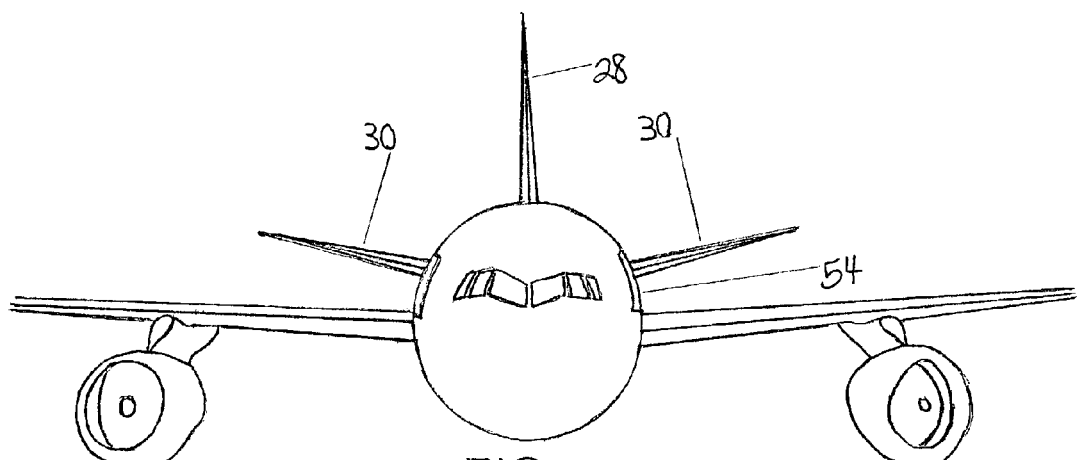

FIG. 8A shows the aerodynamic superiority of a conventional jet liner 54, (with L-Tail technology) over a conventional jet liner 54, with a conventional tail section.

Figure 9:
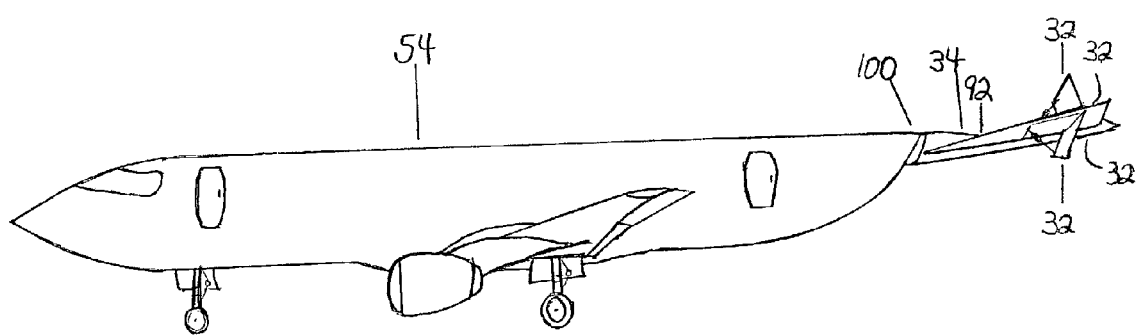
FIG. 9 is the side view of an "L-Tailed" jet liner.

FIG. 9 shows a side view of a conventional jet liner 54, with my L-Tail, (Featuring Parabrakes).

Figure 10:
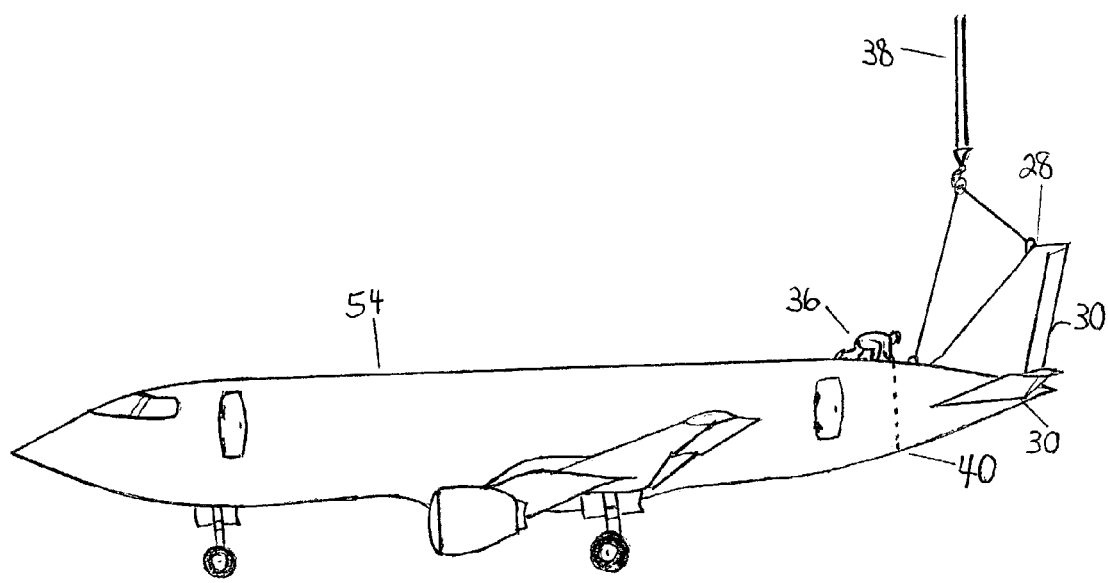
FIG. 10 shows the beginning of the tail section conversion sequence on a conventional jet liner.

FIG. 10 shows the preparation of a Conventional Jet Liner 54, when the conventional tail section to my L-Tail (Featuring Parabrakes) conversion sequence begins.

Figure 11:
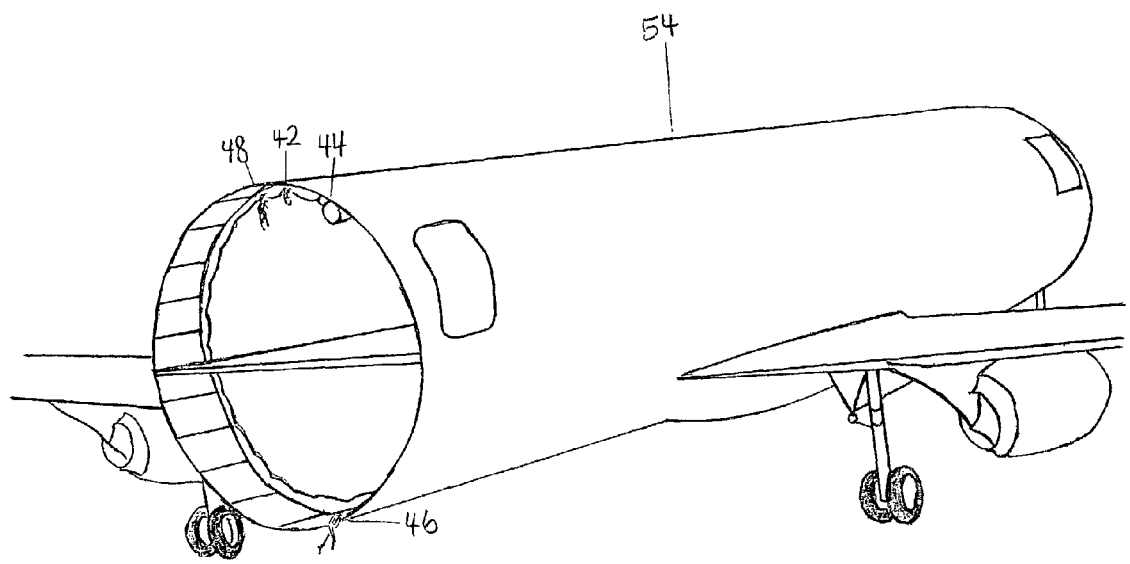
FIG. 11 shows a jet liner with the conventional tail section removed.

FIG. 11 shows a rear internal view of a conventional jet liner 54, and the conventional tail section has been removed.

FIG. 12A is O Ring (Concave) 50, and 12B O Ring Square Bevel 52; a section of O Ring (Concave) 50 has been cut out to show the internal center groove.

FIG. 13 shows a Conventional Jet Liner 54, and O Ring (Concave) 50.

FIGS. 14A, and 14B are views of the O Ring (Convex) 60; 4B is a cut out section, that shows the raised convex groove; O Ring (Convex) Square Bevel 62.

FIGS. 15A, and 15B is the L-Tail Frame Section 56, and Ball Bearing Barrel 58.

FIG. 15 is L-Tail Frame Section 56, and Conventional Jet Liner 54, before assembly.

FIGS. 17A and 17B is Wing Assembly 92, to Boom Pitch 76 preparation.

FIGS. 18A, and 18B is X Cross Wing Pitch Hydraulics 74, to Wing Assembly 92 reference.

FIGS. 19A, and 19B gives a front internal view of the Boom Pitch 76.

FIGS. 20A, and 20B shows the Pivoting Joint 100 Preparation.

FIG. 21 is the Pivoting Joint 100, to L-Tail 34 preparation.

FIG. 22 shows the Pivoting Joint 100, Ball Bearing Barrel 58, and L-Tail Frame Section 56 assembly preparation.

Figure 23A:
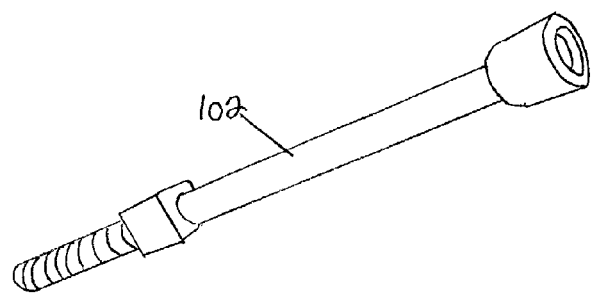
Figure 23B:
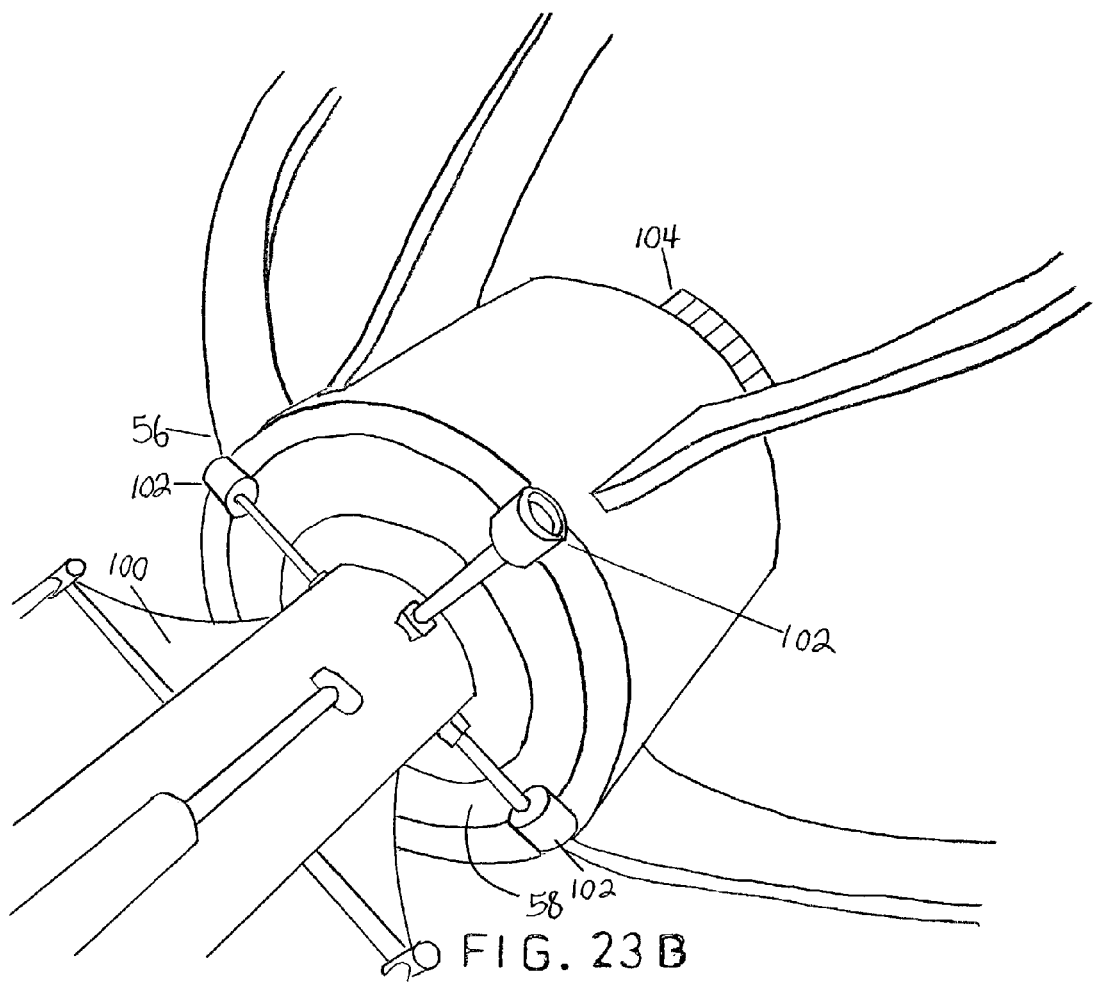

FIGS. 23A, and 23B shows where Roller Bar Stabilizers 102 will be located in relation to the Pivoting Joint 100, and the L-Tail Frame Section 56.

FIG. 24 shows the location of Roller Bar Stabilizers 102, Belt Drive 104, L-Tail Pitch Hydraulics 106, and the Beam Stabilizer 108, which are located within the L-Tail Frame Section 56.

FIGS. 25, and 26 are perspective views of a Stealth Jet Fighter with L-Tail technology.

FIG. 27 shows my L-Tail in a totally rudder position.

FIG. 28 shows the L-Tail 34, to Conventional Jet Liner 54 preparation.

FIG. 29 is the final assembly; Frame Cover 94, and Rear Wing Cap Assembly 96.

Advantages

From the description above, a number of advantages of my L-Tail become evident:

(a) L-Tail technology has only half the wing area surface of conventional tail sections, thus increasing range, speed, and fuel efficiency.

(b) The evolutionary type simplicity of the design decreases the cost, and complication of the manufacturing process.

(c) L-Tail, (featuring Parabrakes) is a Heavy Duty design, with back up (in flight) systems, that conventional tail sections do not supply.

(d) The entire system moves, rather than flaps at the edge of the wings, which significantly enhances maneuverability.

(e) The Natural right angled wing design of my L-Tail increases the Stealth Capabilities of Military Stealth Jet Fighters, and Bombers with conventional tail sections.

Operational and Construction Sequence of Figures

FIG. 1 shows a top view of the Parabrakes 32 in a functioning position.

FIG. 2A shows the complication of a conventional jet fighter in flight. Fly by Wire computer systems are needed to correct mistakes that might cause the jet to go out of control. Thrust Vectoring Exhaust Nozzles 98 are needed to enhance maneuverability, which compensates engine thrust. FIG. 2B shows how the four wings; Conventional Jet Fighter Rudders 24, and Conventional Jet Fighter Horizontal Elevators 26 have direct contact with forward air friction, while a Jet Fighter is in flight, reaching speeds, that exceed Mach. 2.

FIG. 3 shows increased weight, increased air friction, and limited maneuverability of a F-15 Strike Eagle (in flight) with a conventional tail section.

FIGS. 4A, and 4B shows the superior aerodynamics, and simplicity of my L-Tail on a mid 21st century Stealth Jet Fighter, without the need of Thrust Vectoring Exhaust Nozzles 98 (while in flight).

FIG. 5 shows a mid 21st century Stealth Jet Fighter with my L-Tail using the Parabrakes 32 to land on my 21st century Aircraft Carrier called the U.S.S. "INVINCIBLE"; (refer to Pending Provisional Patent titled; "HYPERCLASS" Aircraft Carrier, P.P.A. No. 60/420,816, filed Oct. 25, 2002). The mid 21st century Stealth Jet Fighter does not need a Tail Hook System to land, due to the fact that Parabrakes 32 obsoletes the conventional Tail Hook System used on Conventional Aircraft Carriers.

FIG. 6 demonstrates the sheer simplicity, superior aerodynamics, and attractiveness of my L-Tail (featuring Parabrakes) on a (in flight) business jet.

FIG. 7 shows the increased weight, inferior aerodynamics, and inferior maneuvering ability of an in flight Conventional Jet Liner 54, with a conventional tail section.

FIG. 8A, and 8B shows the superior aerodynamics of my L-Tail on a Conventional Jet Liner 54, when compared to a conventional tail sectioned jet liner 54, (while in flight).

FIG. 9 shows a Conventional Jet Liner 54, with L-Tail technology using Parabrakes 32 to assist in landing; Parabrakes 32 are plomed out into the functioning position.

FIG. 10 begins conversion sequence of a Conventional Tail Sectioned Jet Liner 54, to a Conventional Jet Liner 54 with L-Tail technology. The Worker (Ironworker) 36 is on the top of the Conventional Jet Liner 54 torch cutting off the Conventional tail section. The Cutting Line 40 is the cut where the conventional tail section will separate from the rest of the existing fuselage. The Overhead Crane 38 will then lift the old tail section away from the Conventional Jet Liner 54.

FIG. 11 shows the rear opened section of the existing fuselage. The plumming 42, Climate Control 44, Hydraulics 46, and Electrical 48 has been capped, respectively. Insulation within the fuselage has been rolled back.

FIG. 12 is the O Ring (Concave) 50; the first part fastened to the Conventional Jet Liner 54.

FIG. 13 show the placement of the O Ring (Concave) Conventional Jet Liner 54, which is designed to reinforce the existing fuselage, and interlock with future construction; the O Ring (Convex) 60.

FIG. 14 shows O Ring (Convex) 60, which is welded to the fuselage side of L-Tail Frame Section 56.

FIGS. 15A, and 15B; where the Ball Bearing Barrel 58 goes into the tail end of L-Tail Frame Section 56.

FIG. 16 shows the L-Tail Frame Section 56 (with O Ring (Convex) 60, and Ball Bearing Barrel 58 assembly) lowered into place by an Overhead Crane 38. The added assembly interlocks with O Ring (Concave) 50 that is now welded on the Conventional Jet Liner 54.

FIG. 17; Wing Assembly 92, to Boom Pitch 76 construction; first, Parabrakes 32, Lever hinges 64, and Ball Bearing Rings 66 are assembled to the Wing Assembly 92. Then the two Wing Assemblies 92 are bolted to the Boom Pitch 76 with Pin Shafts 70; Shaft Sockets 72 are aligned with the holes in the Lever Hinges 64, then Pin Shafts 70 pierce Lever Hinges 64, and Shaft Sockets 72.

FIG. 18A shows the wing pitch parts, that exist on the Wing Assembly 92, Lever Hinge 64, and Ball Bearing Ring 66 assembly. FIG. 18B shows the X Cross Wing Pitch Hydraulics 74, to Lever Hinge 64 assembly; (Ball Bearing Ring 66 inserts into Lever Hinge 64, which is connected to Wing Assembly 92). The upward diagonal motion of the X Cross Wing Pitch Hydraulics 74 produces the north/south motion of the Lever Hinges 64, thus producing the north/south wing pitch motion of the Wing Assembly 92.

FIG. 19 demonstrates the wing pitch motion of the Wing Assembly 92, caused by X Cross Wing Pitch Hydraulics 74. Hydraulics 46 for the Parabrakes 32, and the X Cross Wing Pitch Hydraulic 74 systems are now installed into the Boom Pitch 76.

FIGS. 20A, and 20B shows an exploded view, to full completed view (assembly) of the Pivoting Joint 100.

FIG. 21 shows the Pivoting Joint 100 connected to the the L-Tail, with the Parabrakes 32 in an extended functioning position.

FIG. 22 shows the Pivoting Joint 100 into Ball Bearing Barrel 58 into L-Tail Frame Section 56 assembly. The Pivoting Joint 100 is inserted into the Ball Bearing Barrel 58. Then the Pivoting Joint (with the Ball Bearing Barrel 58) inserted around the Bearing Shaft 86 Portion of the Pivoting Joint 100) is inserted into the L-Tail Frame Section 56.

FIG. 23 is the Roller Bar Stabilizers 102 that will lock the L-Tail 34 into place. Roller Bar Stabilizers 102 are screwed into place on both sides of the L-Tail Frame Section 56. Installation of Roller Bar Stabilizers 102 are shown on the external side of the L-Tail Frame Section 56.

FIG. 24 begins with showing the installation of Roller Bar Stabilizers 102 within the internal side of the L-Tail Frame Section 56; The Roller Bar Stabilizers 102 now hold the entire L-Tail 34 (with the Ball Bearing Barrel 58) in a stable position. A Belt Drive 104 is then placed around the Bearing shaft 86 portion of the Pivoting Joint 100. The other side of the Belt Drive 104 is placed around the L-Tail Pitch Hydraulics 106, which powers the Clockwise/Counter Clockwise motion of the L-Tail 34.

FIG. 25 demonstrates the Counter Clockwise 90% pitch on the entire L-Tail 34 powered by the Belt Drive 104, and L-Tail Pitch Hydraulics 106.

FIG. 26 demonstrates the Clockwise 90% pitch on the entire L-Tail 34 powered by the belt Drive 104, and L-Tail Pitch Hydraulics 106.

FIG. 27 demonstrates the life saving value of the pitch motion; the pitch motion turns the entire L-Tail 34 into a giant pivoting rudder, which gives the Jet Fighter the "SUPER LATERAL MANEUVERABILITY" needed to successfully dodge an incoming Heat Seeking, or Laser Guided Missile. This example shows only one of the advantages of the Clockwise/Counter Clockwise motion of my L-Tail. All other typical tail sectioned Jet Fighters would likely be destroyed under this battle scene worst case scenario. But a Fighter with L-Tail technology gives a U.S. Fighter Pilot a chance to live again, Fight again, or "Die another Day".

FIG. 27; connection of L-Tail 34 (with Pivoting Joint 100 within the Ball Bearing Barrel 58 assembly) into the L-Tail Frame Section 56. Workers (Ironworkers) 36 direct the Overhead Crane 38 to the right position.

FIG. 28 shows the final assembly; Frame Cover 96 is placed around, and connected to the L-Tail Frame Section 56, and the Rear Wing Cap Assembly 96 is connected to the rear of Boom Pitch 76.

Conclusions, Ramifications, and Scope

Accordingly, the reader will see that my L-Tail (featuring Parabrakes) is a significant improvement over conventional airplane tail sections in every way imaginable;

it decreases wing surface area, thus increasing range, speed, and fuel efficiency.

it gives passenger Jets a realistic chance of maneuvering out of wind phenomenons, rather than crashing to the ground, like flying caskets.

it has less weight, and less parts than a conventional tail section.

it incorporates a far superior air braking system into wing designs, that is not found conventional aircrafts; Parabrakes 32.

it has an innovative (in flight) emergency backup system, which is not found in conventional airplanes.

it significantly improves performance, speed, control, fuel efficiency, and maneuverability.

it improves safety of airplane travel.

it gives fighters a realistic chance of dodging incoming surface to air laser guided, or heat seeking missiles, during battle.

L-Tail technology (featuring Parabrakes) is a revolutionary airplane tail section design, that is possibly the greatest invention to be introduced into the aircraft industry, since the invention of the Jet Engine. Hundreds of years ago, (long before the Wright Brothers' successful invention of the airplane), unsuccessful airplane inventors attempted the L-Tail concept, but they did not have the technology available today; (Hydraulics 46 Titanium, Aluminum, electronics, super light/super strong composites, act.) to make it work.

The marriage of L-Tail technology to jet fighters (including Stealth Jet Fighters) is Astonishing! Speed, control, maneuverability, fuel efficiency is increased, and stall speed is decreased, (which improves the safety of landings, and improves the attack capabilities of all jet fighters). The natural right angled design of my L-Tail deflects radar much better than the conventional tail sections, found on stealth jet fighters, such as the F-117 Nighthawk, and F-22 Raptor; the introduction of L-Tail technology "instantly obsoletes" the F-22 Raptor, (which is the #1 ranked jet fighter on this planet).

The capabilities of my L-Tail should not be in doubt; if you still do not believe? Step outside, and observe my primary test models, (while in flight); birds. Birds have been using this wing design, even at the time when mankind was still living in caves. The natural beauty, simplicity, and "Magic Motion" of a bird in flight can show you the capabilities of my L-Tail (featuring Parabrakes) in a manner that I cannot put into words; "seeing is believing". L-Tail technology is a "Back to the Future" concept, which is based on evolution, and one cannot challenge evolution; evolution has accomplished in millions of years, what we, (as humans) have tried to do in decades.

I claims:

1. A pivoting aircraft tail section, comprising;
   a. a center boom assembly;
   b. two wing assemblies pivotally mounted on opposite sides of said center boom assembly;
   c. means for controlling the pivoting movement of each said wing assembly;
   d. an upper and lower parabrake pivotally on each said wing assembly, each said parabrake capable of moving between a flush mounted configuration and an extended position of said wing assembly to act as an air brake;
   e. means for controlling the pivoting movement of said parabrake on each said wing assembly;
   f. means to connect said center boom assembly to a fuselage on an aircraft;
   g. a dual axis joint disposed on said center boom assembly enabling said center boom assembly to move along two axis, or any combination thereof, and wherein said means for controlling the pivoting movement of each said wing assembly is a plurality of lever hinges formed on each said wing assembly that extend into said boom assembly and engage a hydraulic cylinder located inside said boom assembly.

2. The pivoting aircraft tail section, as recited in claim 1, wherein said means for controlling the pivoting movement of said parabrake of each said wing assembly is a linking member connected to each said parabrake and a parabrake control hydraulic member, said parabrake control hydraulic member connected to the aircraft's main hydraulic control system.

3. The pivoting aircraft tail section, as recited in claim 1, connecting said center boom assembly to a fuselage on an aircraft with a conical shaped frame member attached to the rear surface of an aircraft and a pivoting joint connected to said center boom assembly and rotatably connected to said frame member.

4. The pivoting aircraft tail section, as recited in claim 3, wherein said pivoting joint includes means for selectively controlling the rotational movement of said center boom assembly on said frame member.

5. The pivoting aircraft tail section, as recited in claim 4, wherein said frame member includes a neck member with a central opening capable of receiving said pivoting joint, which is attached to said center boom assembly.

6. The pivoting aircraft tail section, as recited in claim 5, further including means to hold said pivoting joint inside said neck member.

7. The pivoting aircraft tail section, as recited in claim 6, wherein said means to hold said pivoting joint is two sets of roller bar stabilizers, radially aligned and outward extending from said pivoting joint, said sets of roller bar stabilizers being located, on opposite sides of said neck member.

* * * * *